US012681239B2

(12) United States Patent
Yokomori

(10) Patent No.: US 12,681,239 B2
(45) Date of Patent: Jul. 14, 2026

(54) ELECTRONIC DEVICE AND OPTICAL OUTPUT METHOD

(71) Applicant: NEC Corporation, Tokyo (JP)

(72) Inventor: Takenao Yokomori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 18/503,553

(22) Filed: Nov. 7, 2023

(65) Prior Publication Data

US 2024/0168232 A1      May 23, 2024

(30) Foreign Application Priority Data

Nov. 18, 2022    (JP) ................................. 2022-184585

(51) Int. Cl.
G02B 6/293 (2006.01)
F21V 8/00 (2006.01)
(52) U.S. Cl.
CPC ......... G02B 6/2938 (2013.01); G02B 6/0073 (2013.01); G02B 6/29395 (2013.01)
(58) Field of Classification Search
CPC ....... G02B 6/385; G02B 6/2938; G01M 11/30
See application file for complete search history.

(56) References Cited

U.S. PATENT DOCUMENTS

| | | | |
|---|---|---|---|
| 2009/0052909 A1* | 2/2009 | Hino ........................ | G02B 6/43 |
| | | | 398/200 |
| 2023/0012376 A1* | 1/2023 | Arbore ..................... | G01J 3/45 |

FOREIGN PATENT DOCUMENTS

| | | |
|---|---|---|
| JP | 2007-240228 A | 9/2007 |
| JP | 2011-110375 A | 6/2011 |

* cited by examiner

*Primary Examiner* — Chad H Smith
(74) *Attorney, Agent, or Firm* — Sughrue Mion, PLLC

(57) ABSTRACT

In order to provide an electronic device and the like that enable a user to accurately recognize information being output from the electronic device or the like via a light source, an electronic device according to the present disclosure includes: a first light source that outputs first light of a first wavelength; a second light source that outputs second light of a second wavelength different from the first wavelength; a multiplexing means for multiplexing the first light and the second light and outputting multiplexed light; and an output means for outputting the multiplexed light.

11 Claims, 6 Drawing Sheets

Fig.4

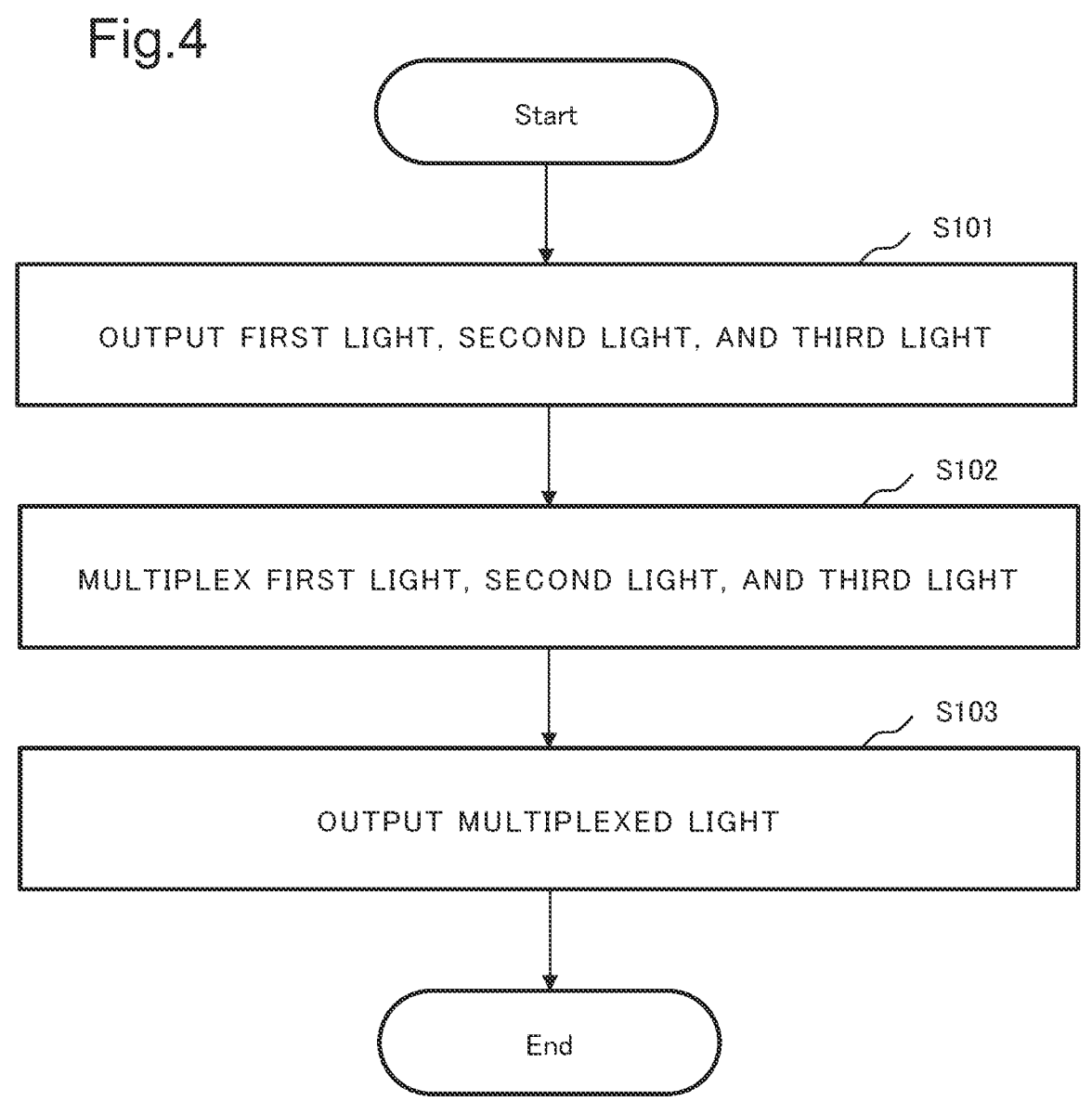

Start

S101

OUTPUT FIRST LIGHT, SECOND LIGHT, AND THIRD LIGHT

S102

MULTIPLEX FIRST LIGHT, SECOND LIGHT, AND THIRD LIGHT

S103

OUTPUT MULTIPLEXED LIGHT

End

Fig.6

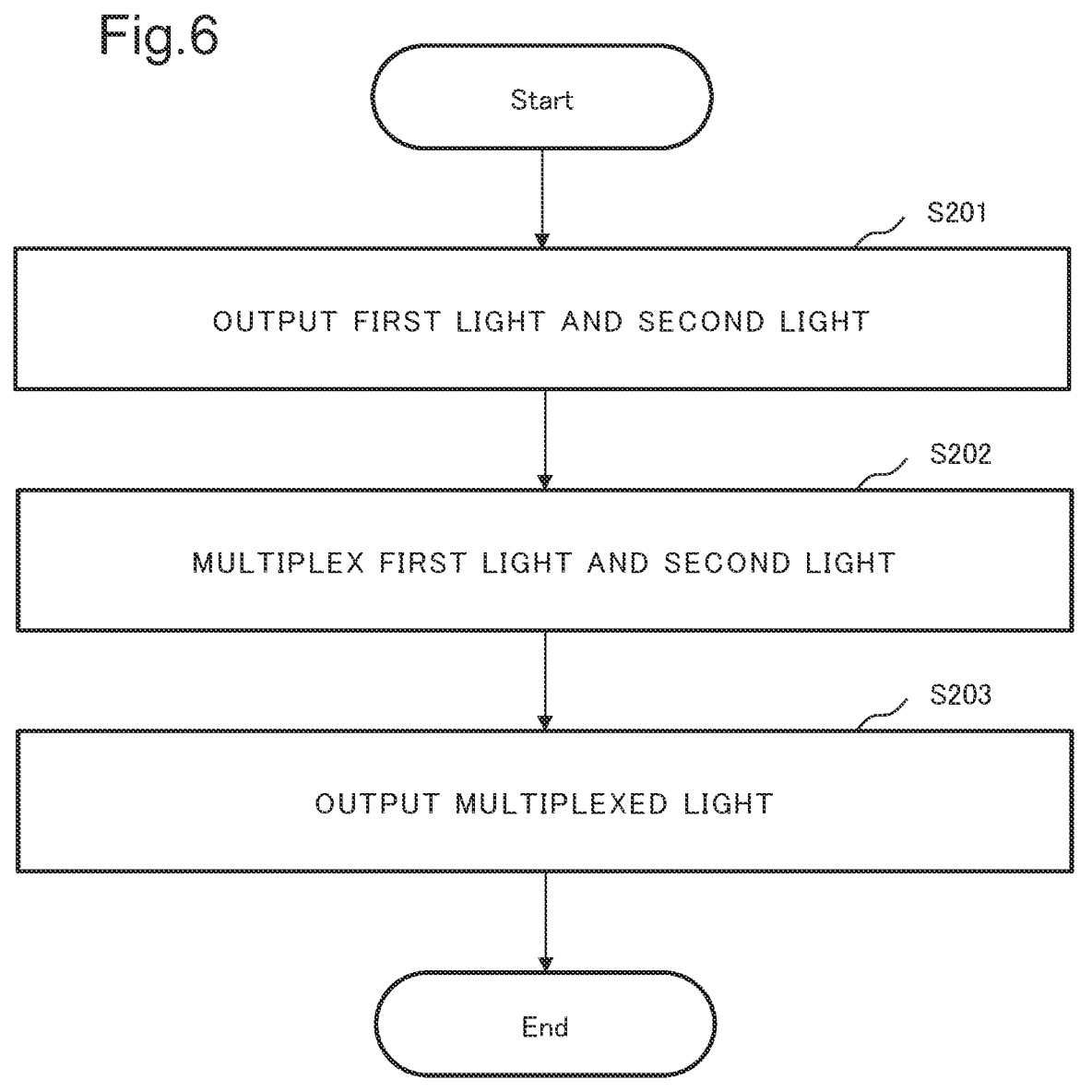

```
                        ┌──────────────────┐
                        │      Start        │
                        └──────────────────┘
                                 │
                                 ▼
                                              S201
┌──────────────────────────────────────────────────────┐
│                                                        │
│         OUTPUT FIRST LIGHT AND SECOND LIGHT            │
│                                                        │
└──────────────────────────────────────────────────────┘
                                 │
                                 ▼
                                              S202
┌──────────────────────────────────────────────────────┐
│                                                        │
│        MULTIPLEX FIRST LIGHT AND SECOND LIGHT          │
│                                                        │
└──────────────────────────────────────────────────────┘
                                 │
                                 ▼
                                              S203
┌──────────────────────────────────────────────────────┐
│                                                        │
│              OUTPUT MULTIPLEXED LIGHT                  │
│                                                        │
└──────────────────────────────────────────────────────┘
                                 │
                                 ▼
                        ┌──────────────────┐
                        │       End         │
                        └──────────────────┘
```

ELECTRONIC DEVICE AND OPTICAL OUTPUT METHOD

This application is based upon and claims the benefit of priority from Japanese Patent Application No. 2022-184585, filed on Nov. 18, 2022, the disclosure of which is incorporated herein in its entirety by reference.

TECHNICAL FIELD

The present disclosure relates to, for example, an electronic device that outputs information to a user via a light source.

BACKGROUND ART

In general, an electronic device such as a router is provided with a light emitting device (LED) for indicating a state of the electronic device to an outside. A control device disposed inside the electronic device lights up the LED when, for example, determining that a state of temperature or the like of the electronic device is abnormal. Thereby, the electronic device can notify an external user or the like of information such as occurrence of abnormality.

PTL 1 (Japanese Patent Application Laid-open Publication No. 2011-110375), for example, discloses a full color LED including LED chips of colors of red, green, and blue.

PTL 2 (Japanese Patent Application Laid-open Publication No. 2007-240228) discloses two polarization maintaining-type optical fibers, an optical fiber coupler to an input side of which the polarization maintaining-type optical fibers are connected, an optical fiber connected to an output side of the optical fiber coupler, and a collimator lens causing emission light of the optical fibers to be parallel light.

SUMMARY

For example, when an electronic device notifies, based on an LED, an external user of information as described above, there are preferably many types of colors in an LED in order to increase types of information. However, when a full color LED as described in PTL 2 is used, optical axes of LED chips of colors of red, green, and blue are deviated. Therefore, according to a location relation between an electronic device and a user, it is difficult for the user to view light of some colors. As a result, it is difficult, in some cases, for the user to accurately recognize information being output from the electronic device via a light source such as an LED.

In view of the problem described above, the present disclosure has been made, and an object of the present disclosure is to cause a user to accurately recognize information being output from an electronic device or the like via a light source.

An electronic device according to the present disclosure includes: a first light source that outputs first light of a first wavelength; a second light source that outputs second light of a second wavelength different from the first wavelength; a multiplexing means for multiplexing the first light and the second light and outputting multiplexed light; and an output means for outputting the multiplexed light.

An optical output method according to the present disclosure includes: outputting first light of a first wavelength and second light of a second wavelength different from the first wavelength; multiplexing the first light and the second light; and outputting multiplexed light in which the first light and the second light are multiplexed.

According to the present disclosure, an electronic device and the like that enable a user to accurately recognize information being output from an electronic device or the like via a light source are able to be provided.

BRIEF DESCRIPTION OF THE DRAWINGS

Exemplary features and advantages of the present disclosure will become apparent from the following detailed description when taken with the accompanying drawings in which:

FIG. 4 is a flowchart illustrating an operation example of the electronic device according to the first example embodiment of the present disclosure;

FIG. 6 is a flowchart illustrating an operation example of the electronic device according to the second example embodiment of the present disclosure.

EXAMPLE EMBODIMENT

First Example Embodiment

Figure 1:
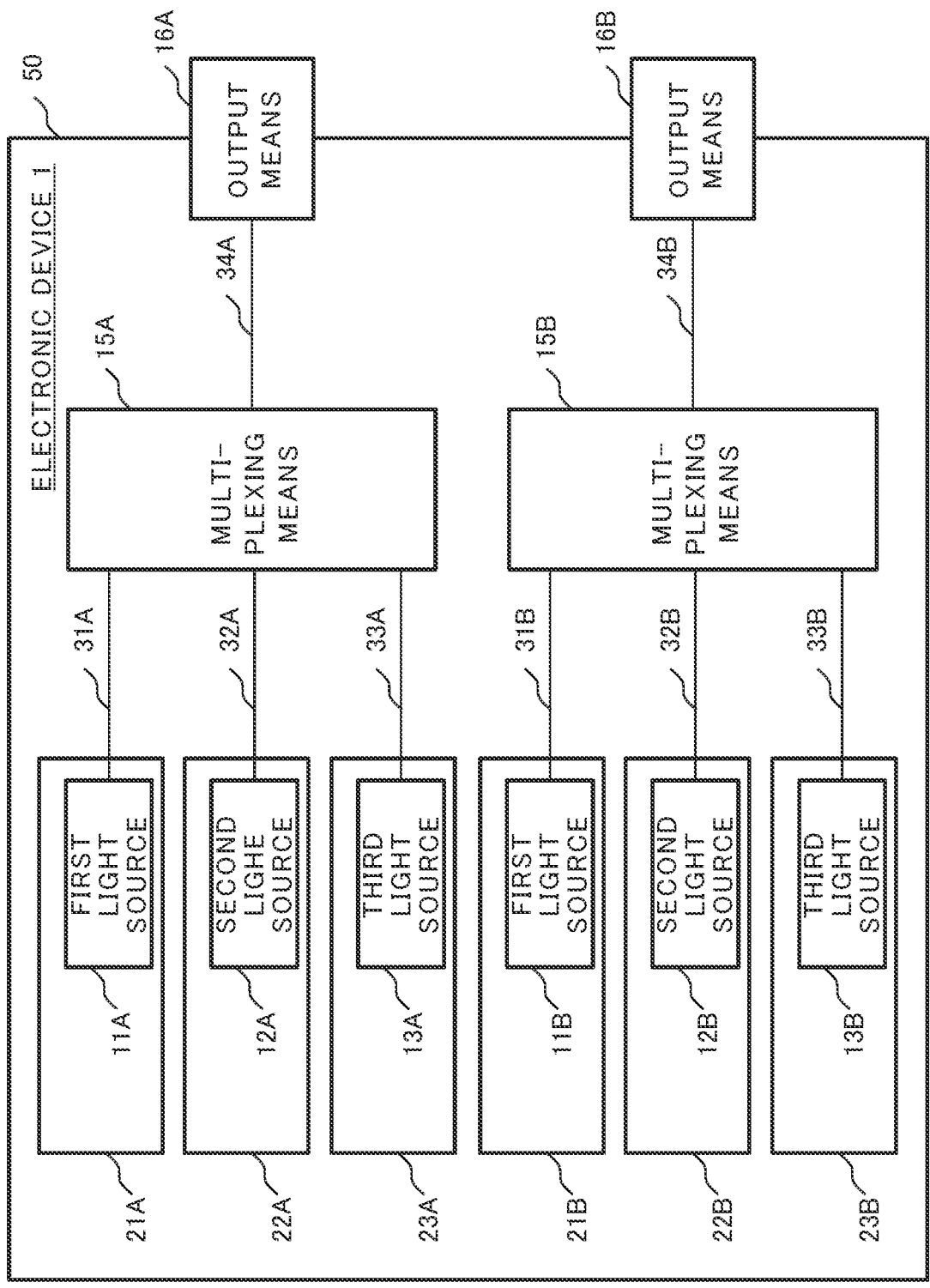
FIG. 1 is a block diagram illustrating a configuration example of an electronic device according to a first example embodiment of the present disclosure.
Figure 2:
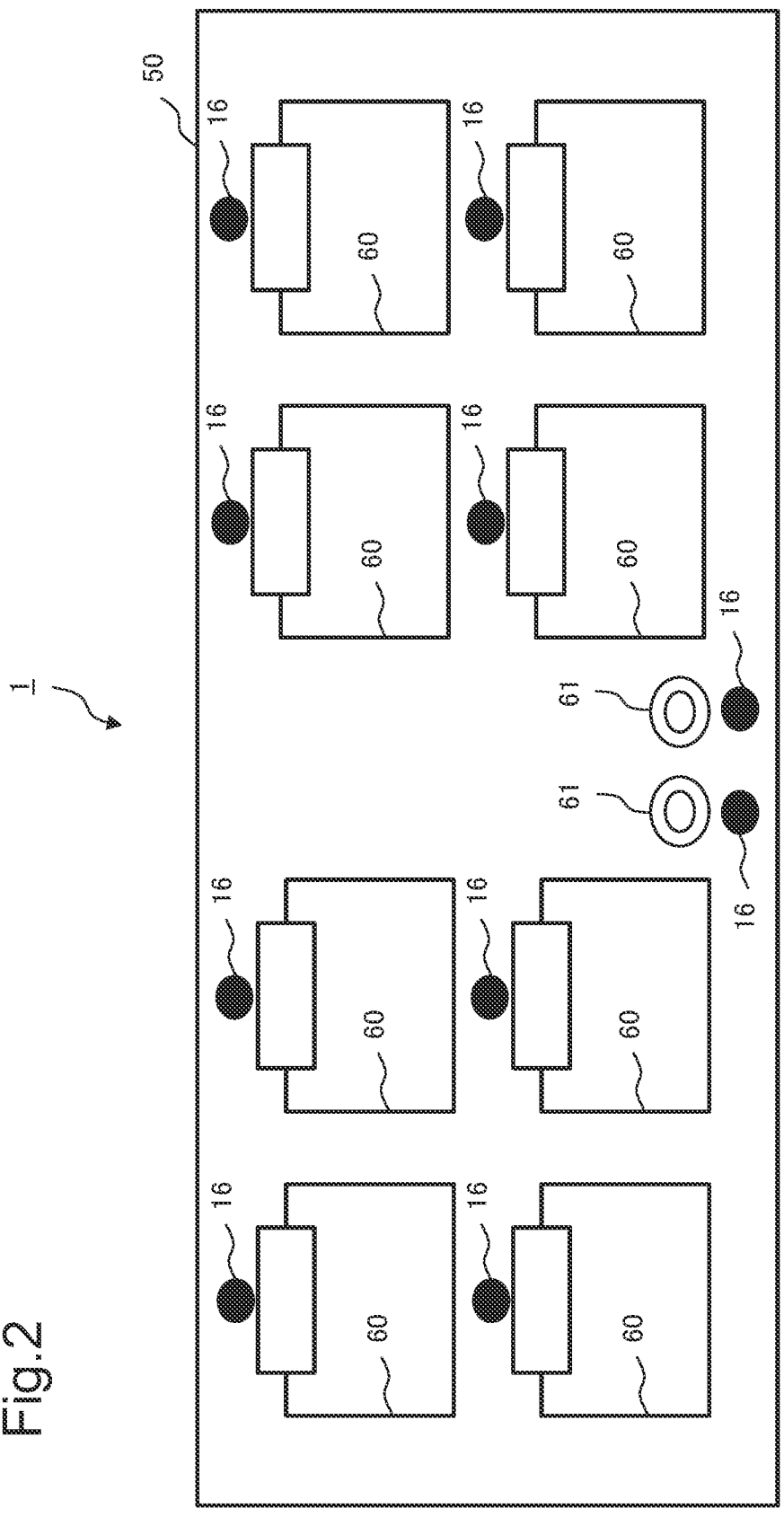
FIG. 2 is a diagram illustrating details of the electronic device according to the first example embodiment of the present disclosure.
Figure 3:
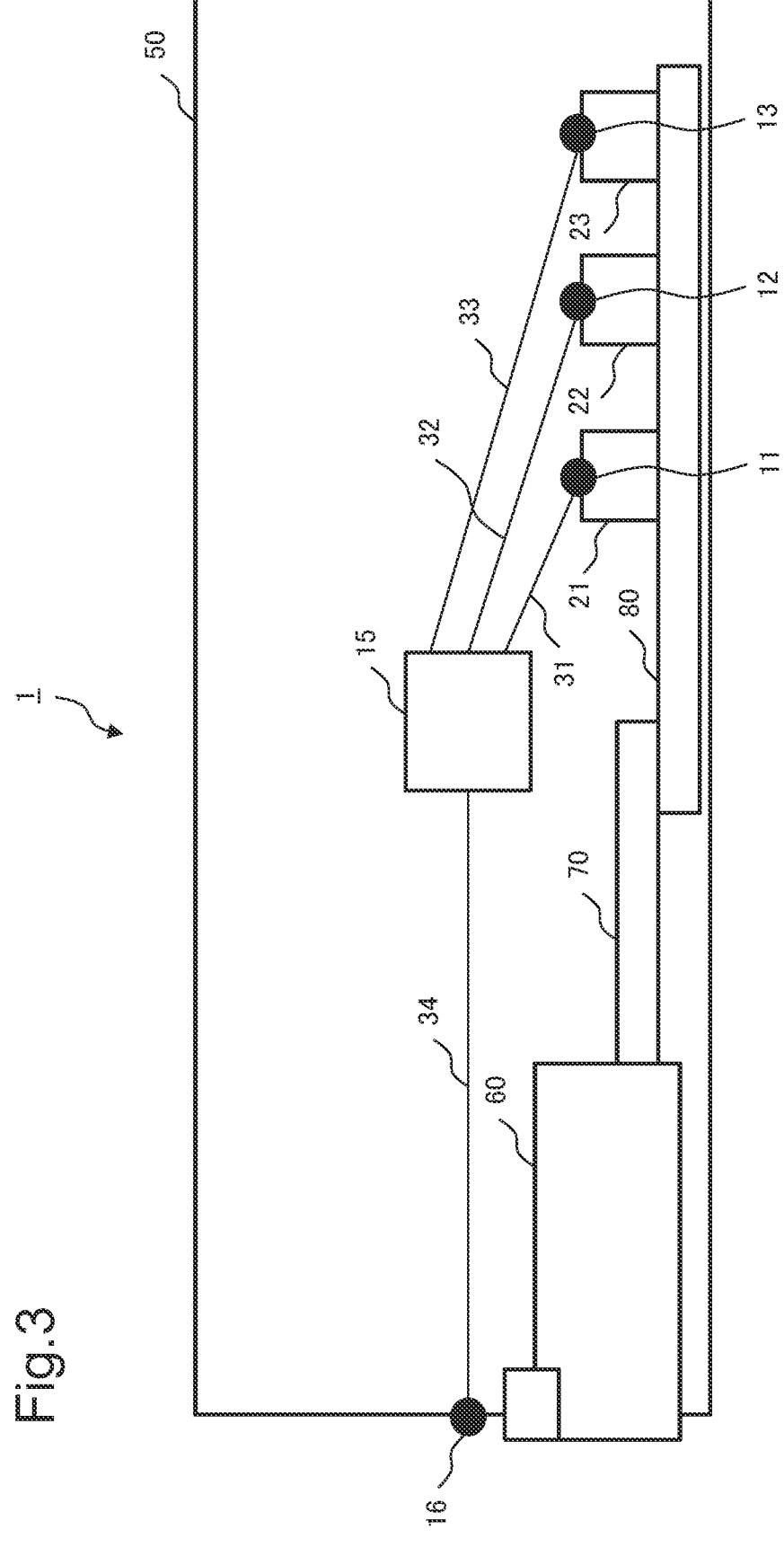
FIG. 3 is a diagram illustrating details of the electronic device according to the first example embodiment of the present disclosure.

An electronic device 1 according to a first example embodiment is described based on FIG. 1, FIG. 2, and FIG. 3. FIG. 1 is a block diagram illustrating a configuration example of the electronic device 1. FIG. 2 is a diagram illustrating details of the electronic device 1. FIG. 3 is a diagram illustrating details of the electronic device 1.

A configuration of the electronic device 1 is described. The electronic device 1 includes a first light source 11, a second light source 12, a third light source 13, a multiplexing means 15, an output means 16, a first integrated circuit 21, a second integrated circuit 22, a third integrated circuit 23, and a housing 50. The electronic device 1 further includes a first optical fiber 31, a second optical fiber 32, a third optical fiber 33, and a fourth optical fiber 34.

As illustrated in FIG. 1, the electronic device 1 includes, as two first light sources 11, first light sources 11A and 11B. The electronic device 1 includes, as two first integrated circuits 21, first integrated circuits 21A and 21B. The first light source 11A is disposed on the first integrated circuit 21A. The first light source 11B is disposed on the first integrated circuit 21B.

The first light source 11 outputs first light of a first wavelength. The first wavelength is, for example, a wavelength between 760 to 830 nm. In this case, the first light is red light. The first light source 11 lights up when, for example, receiving an instruction from the first integrated circuit 21.

As illustrated in FIG. 1, the electronic device 1 includes, as two second light sources 12, second light sources 12A and 12B. The electronic device 1 includes, as two second integrated circuits 22, second integrated circuits 22A and 22B.

The second light source 12A is disposed on the second integrated circuit 22A. The second light source 12B is disposed on the second integrated circuit 22B.

The second light source 12 outputs second light of a second wavelength different from the first wavelength. The second wavelength is, for example, a wavelength between 430 to 495 nm. In this case, the second light is blue light. The second light source 12 lights up when, for example, receiving an instruction from the second integrated circuit 22.

As illustrated in FIG. 1, the electronic device 1 includes, as two third light sources 13, third light sources 13A and 13B. The electronic device 1 includes, as two third integrated circuits 23, third integrated circuits 23A and 23B. The third light source 13A is disposed on the third integrated circuit 23A. The third light source 13B is disposed on the third integrated circuit 23B.

The third light source 13 outputs third light of a third wavelength different from both of the first wavelength and the second wavelength. The third wavelength is, for example, a wavelength between 500 to 550 nm. In this case, the third light is green light. The third light source 13 lights up when, for example, receiving an instruction from the third integrated circuit 23.

The wavelengths and colors of light described above indicate one example and may be different from the examples. The first light source 11, the second light source 12, and the third light source 13 may light up, based on an instruction from anything other than an integrated circuit on which the light source itself is mounted. In the above-described description, the first light source 11, the second light source 12, and the third light source 13 are disposed on integrated circuits different from each other. In contrast, the first light source 11, the second light source 12, and the third light source 13 may be disposed on the same integrated circuit. The number of light sources is not limited to three and may be at least two or more.

As illustrated in FIG. 1, the electronic device 1 includes, as two first optical fibers 31, first optical fibers 31A and 31B. The first optical fiber 31A is optically connected to the first light source 11A. The first optical fiber 31A propagates, to a multiplexing means 15A, first light output from the first light source 11A. The first optical fiber 31B is optically connected to the first light source 11B. The first optical fiber 31B propagates, to a multiplexing means 15B, first light output from the first light source 11B.

As illustrated in FIG. 1, the electronic device 1 includes, as two second optical fibers 32, second optical fibers 32A and 32B. The second optical fiber 32A is optically connected to the second light source 12A. The second optical fiber 32A propagates, to the multiplexing means 15A, second light output from the second light source 12A. The second optical fiber 32B is optically connected to the second light source 12B. The second optical fiber 32B propagates, to the multiplexing means 15B, second light output from the second light source 12B.

As illustrated in FIG. 1, the electronic device 1 includes, as two third optical fibers 33, third optical fibers 33A and 33B. The third optical fiber 33A is optically connected to the third light source 13A. The third optical fiber 33A propagates, to the multiplexing means 15A, third light output from the third light source 13A. The third optical fiber 33B is optically connected to the third light source 13B. The third optical fiber 33B propagates, to the multiplexing means 15B, third light output from the third light source 13B.

The optical fiber is provided according to a light source, and therefore, when, for example, the number of light sources is equal to or more than four, the electronic device

1 may include an additional optical fiber, in addition to the first optical fiber 31, the second optical fiber 32, and the third optical fiber 33. Note that light output from a light source may be converged by a lens, not illustrated, and caused to enter each optical fiber.

In the electronic device 1, each light source and the multiplexing means 15 are connected by using an optical fiber. The multiplexing means 15A multiplexes beams of light output from light sources and outputs multiplexed light. The first light source 11A and the multiplexing means 15A are optically connected by using the first optical fiber 31A. The second light source 12A and the multiplexing means 15A are optically connected by using the second optical fiber 32A. The third light source 13A and the multiplexing means 15A are optically connected by using the third optical fiber 33A.

The first light source 11B and the multiplexing means 15B are optically connected by using the first optical fiber 31B. The second light source 12B and the multiplexing means 15B are optically connected by using the second optical fiber 32B. The third light source 13B and the multiplexing means 15B are optically connected by using the third optical fiber 33B.

The multiplexing means 15A multiplexes first light from the first light source 11A, second light from the second light source 12A, and third light from the third light source 13A and outputs multiplexed light. The multiplexing means 15B multiplexes first light from the first light source 11B, second light from the second light source 12B, and third light from the third light source 13B and outputs multiplexed light.

The output means 16 outputs multiplexed light from the multiplexing means 15. Specifically, the output means 16 outputs, toward an outside of the electronic device 1, multiplexed light input via the fourth optical fiber 34. The output means 16 is, for example, a diffusion lens. In this case, the output means 16 outputs, based on diffusion, multiplexed light. Thereby, a user present outside the electronic device 1 can confirm light being output, even when present away from an extension line of an optical axis of the output means 16.

The housing 50 is an exterior of the electronic device 1. The housing 50 is configured, for example, by using aluminum or the like. As illustrated in FIG. 1, the housing 50 accommodates the first light sources 11A and 11B, the second light sources 12A and 12B, the third light sources 13A and 13B, the multiplexing means 15A and 15B, the output means 16A and 16B, the first integrated circuits 21A and 21B, the second integrated circuits 22A and 22B, the third integrated circuits 23A and 23B, and optical fibers.

Next, by using FIG. 2, a disposition location of the output means 16 in the electronic device 1 is described. FIG. 2 is a diagram illustrating details of the electronic device 1. As illustrated in FIG. 2, on one face of the housing 50, a plurality of output means 16, a plurality of local area network (LAN) cable ports 60, and a plurality of power supply cable ports 61 are disposed.

In FIG. 1, two configurations including the first light source 11, the second light source 12, the third light source 13, the multiplexing means 15, the output means 16, the first integrated circuit 21, the second integrated circuit 22, the third integrated circuit 23, the first optical fiber 31, the second optical fiber 32, the third optical fiber 33, and the fourth optical fiber 34 are illustrated. In the example of FIG. 2, the electronic device 1 includes ten of the configurations and therefore, includes ten output means 16 as illustrated in FIG. 2. FIG. 1 schematically illustrates two configurations being a part of the ten configurations illustrated in FIG. 2.

The LAN cable port 60 is a port in/from which a LAN cable can be inserted/removed. The power supply cable port 61 is a port in/from which a power supply cable can be inserted/removed. In this manner, on one face of the housing 50, a port in/from which a cable can be inserted/removed is disposed. The above-described LAN cable port 60 and power supply cable port 61 indicate one example, and a type of a port is not limited to the above-described LAN cable port 60 and power supply cable port 61.

A plurality of output means 16 are disposed in locations relevant to the above-described ports. For example, an output means 16 relevant to the LAN cable port 60 is disposed on an upper side of the LAN cable port 60. An output means 16 relevant to the power supply cable port 61 is disposed on a lower side of the power supply cable port 61.

Next, by using FIG. 3, one example of a location relation of configurations in the electronic device 1 is described. The electronic device 1 includes a plurality of ports, but in FIG. 3, one LAN cable port 60 is merely illustrated.

As illustrated in FIG. 3, the electronic device 1 accommodates the first light source 11, the second light source 12, the third light source 13, the multiplexing means 15, the output means 16, the first integrated circuit 21, the second integrated circuit 22, the third integrated circuit 23, the first optical fiber 31, the second optical fiber 32, the third optical fiber 33, the fourth optical fiber 34, the LAN cable port 60, an electric circuit 70, and a substrate 80.

In FIG. 3, for simple description, one configuration being a part of the ten configurations illustrated in FIG. 2 is schematically illustrated.

As illustrated in FIG. 3, the LAN cable port 60 is attached on the housing 50. The LAN cable port 60 is connected to the substrate 80 via the electric circuit 70. When an LAN cable is inserted in the LAN cable port 60, the LAN cable is electrically connected to the substrate 80 via the electric circuit 70.

On the substrate 80, the first integrated circuit 21, the second integrated circuit 22, and the third integrated circuit 23 are attached. The first integrated circuit 21, the second integrated circuit 22, and the third integrated circuit 23 may be attached on substrates different from each other.

On the substrate 80, a monitoring means, which is not illustrated, monitors an insertion/removal state of a LAN cable, temperature, and presence/absence of another abnormality and acquires a state of the LAN cable and the substrate. The monitoring means outputs an instruction relevant to the acquired state to at least one of the first light source 11, the second light source 12, or the third light source 13.

The monitoring means issues, when, for example, a LAN cable is being inserted in the LAN cable port 60, a lighting-on instruction to the first light source 11 and issues a lighting-off instruction to the second light source 12 and the third light source 13. Thereby, red light is output from the output means 16. Therefore, a user outside the electronic device 1 confirms the red light and thereby, can recognize that the LAN cable is being inserted.

The monitoring means issues, when a LAN cable is in a state of removal from the LAN cable port 60, a lighting-on instruction to the second light source 12 and issues a lighting-off instruction to the first light source 11 and the third light source 13. Thereby, blue light is output from the output means 16. Therefore, a user outside the electronic device 1 confirms the blue light and thereby, can recognize that the LAN cable is in a state of removal from the LAN cable port 60.

The monitoring means issues, when, for example, a temperate inside the electronic device 1 exceeds a threshold, a lighting-on instruction to the first light source 11 and the second light source 12 and a lighting-off instruction to the third light source 13. Thereby, violet light is output from the output means 16. Therefore, a user outside the electronic device 1 confirms the violet light and thereby, can recognize that the temperature exceeds the threshold.

Next, by using FIG. 4, an operation of the electronic device 1 is described.

The first light source 11 outputs first light, the second light source 12 outputs second light, and the third light source 13 outputs third light (S101). At least one of the first light source 11, the second light source 12, or the third light source 13 may be in a lighting-off state.

The multiplexing means 15 multiplexes the first light, the second light, and the third light (S102).

The output means 16 outputs multiplexed light (S103).

As described above, the electronic device 1 includes at least the first light source 11 that outputs first light of a first wavelength, the second light source 12 that outputs second light of a second wavelength different from the first wavelength, the multiplexing means 15 for multiplexing the first light and the second light and outputting multiplexed light, and the output means 16 for outputting the multiplexed light. The electronic device 1 may further include the third light source 13 that outputs third light.

In the electronic device 1, at least first light and second light are multiplexed by the multiplexing means 15, and therefore both of the first light and the second light are output by the output means 16 along an optical axis of the multiplexing means 15. When the third light source 13 is provided for the electronic device 1, multiplexed light of first light, second light, and third light is output from the output means 16 along the optical axis of the multiplexing means 15. When, for example, optical axes of first light and second light are deviated, the first light and the second light are easily propagated, after being output from the output means 16, to ranges different from each other. Therefore, according to a location relation between an electronic device and a user, it has been difficult for the user, in some cases, to view only either of the first light and the second light. However, in the electronic device 1, both of first light and second light are output from the output means 16 along a common optical axis. Therefore, in the electronic device 1, occurrence of an event in which only either of the first light and the second light is viewed by a user is reduced. When the third light source 13 is provided for the electronic device 1, occurrence of an event in which only a part of first light, second light, and third light is viewed by a user is reduced. As a result, according to the electronic device 1, a user can accurately recognize information output from an electronic device via a light source such as a LED.

In the description, it has been described that the electronic device 1 includes the first light source 11, the second light source 12, the third light source 13, the multiplexing means 15, the output means 16, the first integrated circuit 21, the second integrated circuit 22, the third integrated circuit 23, the housing 50, and optical fibers. However, also in an optical output system in which the housing 50 is removed from the electronic device 1, the advantageous effect is exhibited. An application target of the optical output system is not limited to an electronic device and the optical output system may be applicable to an optical module such as an optical transceiver.

7

Second Example Embodiment

Figure 5:
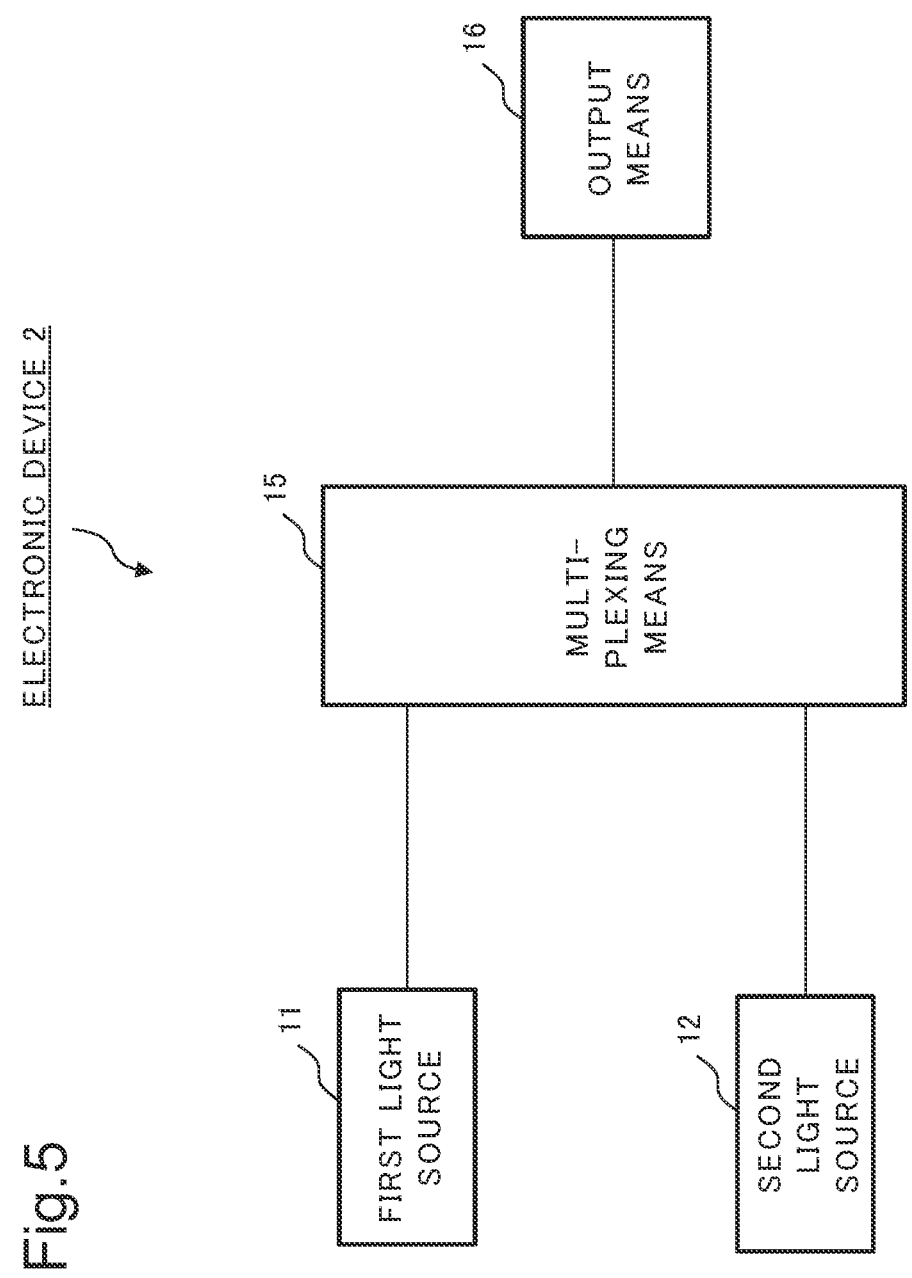
FIG. 5 is a block diagram illustrating a configuration example of an electronic device according to a second example embodiment of the present disclosure.

An electronic device 2 according to a second example embodiment is described based on FIG. 5. FIG. 5 is a block diagram illustrating a configuration example of the electronic device 2.

A configuration of the electronic device 2 is described. As illustrated in FIG. 5, the electronic device 2 includes a first light source 11 that outputs first light of a first wavelength, a second light source 12 that outputs second light of a second wavelength different from the first wavelength, a multiplexing means 15 for multiplexing the first light and the second light and outputting multiplexed light, and an output means 16 for outputting the multiplexed light.

Next, based on FIG. 6, an operation of the electronic device 2 is described. FIG. 6 is a flowchart illustrating an operation of the electronic device 2. An optical output method illustrated in the flowchart may be executed by an information processing device through a program.

The first light source 11 outputs first light and the second light source 12 outputs second light (S201).

The multiplexing means 15 multiplexes the first light and the second light (S202).

The output means 16 outputs multiplexed light (S203).

As described above, the electronic device 2 includes the first light source 11 that outputs first light of a first wavelength, the second light source 12 that outputs second light of a second wavelength different from the first wavelength, the multiplexing means 15 for multiplexing the first light and the second light and outputting multiplexed light, and the output means 16 for outputting the multiplexed light.

In the electronic device 2, first light and second light are multiplexed by the multiplexing means 15, and therefore both of the first light and the second light are output from the output means 16 along an optical axis of the multiplexing means 15. When optical axes of the first light and the second light are deviated, the first light and the second light are easily propagated, after being output from the output means 16, to ranges different from each other. Therefore, according to a location relation between the output means 16 and a user, it has been difficult for the user, in some cases, to view only either of the first light and the second light. However, in the electronic device 2, both of the first light and the second light are output from the output means 16 along a common optical axis. Therefore, in the electronic device 2, occurrence of an event in which only either of the first light and the second light is viewed by a user is reduced. As a result, according to the electronic device 2, a user can accurately recognize information output via a light source such as a LED.

Components of the electronic devices 1 and 2 may be disposed in one housing or may configure a system by being disposed in separate housings. At that time, a plurality of components may be accommodated in one housing.

According to the description of the electronic device 1, in FIG. 1, two configurations including the first light source 11, the second light source 12, the third light source 13, the multiplexing means 15, the output means 16, the first integrated circuit 21, the second integrated circuit 22, the third integrated circuit 23, the first optical fiber 31, the second optical fiber 32, the third optical fiber 33, and the fourth optical fiber 34 are illustrated. FIG. 2 illustrates an example including ten of the configurations, and FIG. 3 illustrates an example including one of the configurations. In other words, FIG. 1 and FIG. 3 schematically illustrate a part of the ten configurations illustrated in FIG. 2. According to the description of the electronic device 2, FIG. 5 illustrates one configuration including the first light source 11, the second light source 12, the multiplexing means 15, and the output means 16. The number of the above-described configurations is not limited to the examples. For example, in the electronic device 1, the number of the above-described configurations may be one or may exceed ten. In the electronic device 2, two or more configurations may be provided for the above-described configuration. With regard to the light source, in the electronic device 1, an example in which beams of light from three light sources are multiplexed has been described, and in the electronic device 2, an example in which beams of light from two light sources are multiplexed has been described. However, the number of light sources is not limited to the examples and may be N equal to or more than at least two.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An electronic device comprising:
a port in/from which a cable can be inserted/removed;
a first light source configured to output first light of a first wavelength;
a second light source configured to output second light of a second wavelength different from the first wavelength;
a third light source configured to output third light of a third wavelength different from the first wavelength and the second wavelength;
a multiplexer configured to multiplex the first light, the second light and the third light, and to output multiplexed light;
an optical component disposed in a location relevant to the port and configured to output the multiplexed light; and
a monitoring circuit configured to acquire at least one of an insertion/removal state of the cable and an internal temperature of the electronic device as a state of the electronic device, and output instructions to light the first light source, the second light source and the third light source differently for each state.

2. The electronic device according to claim 1, wherein the first light source, the second light source and the light source are disposed on integrated circuits different from each other.

3. The electronic device according to claim 1, wherein the first light source and the multiplexer are optically connected by a first optical fiber,
wherein the second light source and the multiplexer are optically connected by a second optical fiber different from the first optical fiber, and
wherein the third light source and the multiplexer are optically connected by a third optical fiber different from the first optical fiber and the second optical fiber.

4. The electronic device according to claim 2, wherein the first light source and the multiplexer are optically connected by a first optical fiber,
wherein the second light source and the multiplexer are optically connected by a second optical fiber different from the first optical fiber, and
wherein the third light source and the multiplexer are optically connected by a third optical fiber different from the first optical fiber and the second optical fiber.

5. The electronic device according to claim 1, wherein the optical component is configured to output, by using a diffusion lens, the multiplexed light.

6. The electronic device according to claim 1, comprising:

a fourth optical fiber that is different from the first optical fiber, the second optical fiber and the third optical fiber, and which guides the multiplexed light to the optical component.

7. The electronic device according to claim 1, wherein the monitoring circuit is configured to, in a case of acquiring the internal temperature of the electronic device as the state of the electronic device, output instructions to light the first light source, the second light source and the third light source differently depending on whether the internal temperature exceeds a threshold or not.

8. The electronic device according to claim 1, wherein the cable is a local area network (LAN) cable.

9. The electronic device according to claim 1, wherein the first light, the second light and the third light are visible lights.

10. The electronic device according to claim 1, wherein the first wavelength, the second wavelength, and the third wavelength are within the range of 360 to 830 nm and are mutually different wavelengths.

11. An optical output method for an electronic device, the optical method comprising:

outputting, by a first light source, first light of a first wavelength;

outputting, by a second light source, second light of a second wavelength different from the first wavelength; and outputting, by a third light source, third light of a third wavelength different from the first wavelength and the second wavelength;

multiplexing, by a multiplexer, the first light, the second light and the third light;

and light;

outputting, by an optical component disposed in a location relevant to a port being able to be a cable inserted/removed, multiplexed light in which the first light, the second light and the third are multiplexed;

acquiring, by a monitoring circuit, at least one of an insertion/removal state of the cable and an internal temperature of the electronic device as a state of the electronic device; and outputting, by the monitoring circuit, instructions to light the first light source, the second light source and the third light source differently for each state.

\* \* \* \* \*